United States Patent [19]
Cyphelly

[11] 3,918,486
[45] Nov. 11, 1975

[54] DEVICE FOR TRANSMITTING A PRESSURE FLUID FROM A STATIONARY SOURCE TO A ROTATING SHAFT

[76] Inventor: Ivan Jaroslav Cyphelly, Forchstrasse 968, 8128 Hinteregg, Switzerland

[22] Filed: Mar. 11, 1974

[21] Appl. No.: 449,959

[30] Foreign Application Priority Data
  Mar. 14, 1973 Switzerland.......................... 3712/73
  Aug. 24, 1973 Switzerland....................... 12216/73

[52] U.S. Cl................. 137/580; 251/161; 251/175; 137/599
[51] Int. Cl.²......................................... F16L 27/00
[58] Field of Search ...... 137/580, 625.11, 627, 599; 251/161, 175, 283

[56] References Cited
UNITED STATES PATENTS

| | | | |
|---|---|---|---|
| 2,024,690 | 12/1935 | Harris................................ | 137/627 |
| 2,500,383 | 3/1950 | Sadler et al..................... | 137/580 X |
| 2,521,119 | 9/1950 | Green............................. | 137/625.11 |
| 2,798,506 | 7/1957 | Baker et al. ........................ | 137/580 |
| 2,964,061 | 12/1960 | Rawson et al. ................ | 137/625.11 |
| 2,972,357 | 2/1961 | Ford et al. ..................... | 137/625.11 |
| 3,012,574 | 12/1961 | Baker et al. ........................ | 137/580 |
| 3,032,066 | 5/1962 | Smith.................................. | 137/580 |
| 3,215,163 | 11/1965 | Henderson...................... | 251/175 X |
| 3,310,067 | 3/1967 | Meyer................................. | 137/580 |
| 3,326,234 | 6/1957 | Baker et al. ........................ | 137/580 |

*Primary Examiner*—Alan Cohan
*Assistant Examiner*—Gerald A. Michalsky
*Attorney, Agent, or Firm*—Hans Berman

[57] ABSTRACT

Pressure fluid is transmitted from a stationary supply line to a manifold conduit system in a rotating shaft through an annular sealing member fixedly mounted on the shaft. Orifices of branch conduits of the manifold system are circumferentially spaced in an engagement face of the sealing member. A shoe member mounted on a stationary support has a recessed face and is biased toward sealing engagement of its face with the engagement face of the sealing ring during rotation of the shaft, whereby the recess is covered by the engagement face and sequentially communicates with the orifices of the manifold conduit system. The recess in the shoe member is supplied with the fluid to be transmitted, and a check valve in each branch conduit of the manifold system opens the associated conduit under the pressure of the fluid in the communicating recess.

16 Claims, 18 Drawing Figures

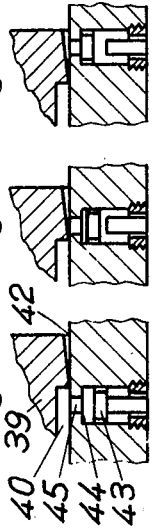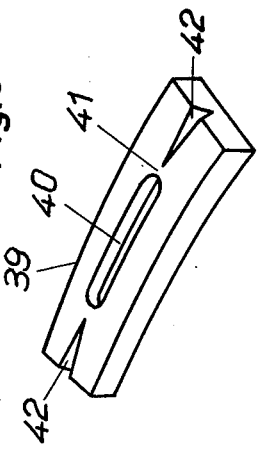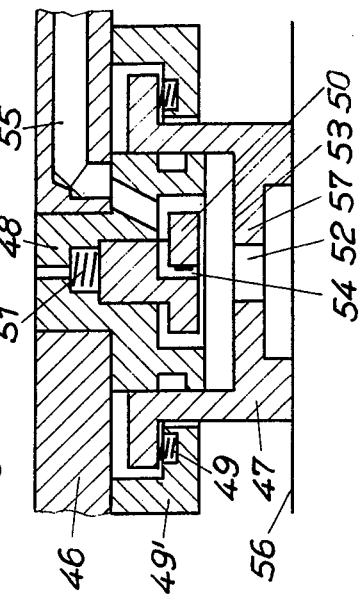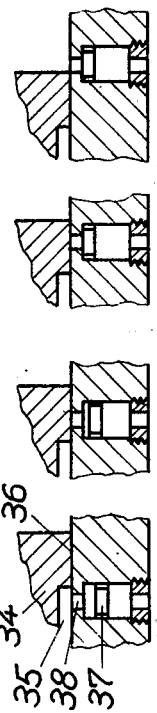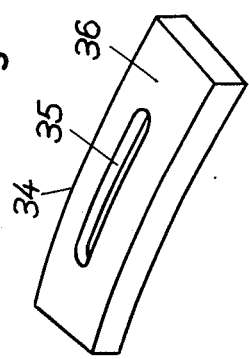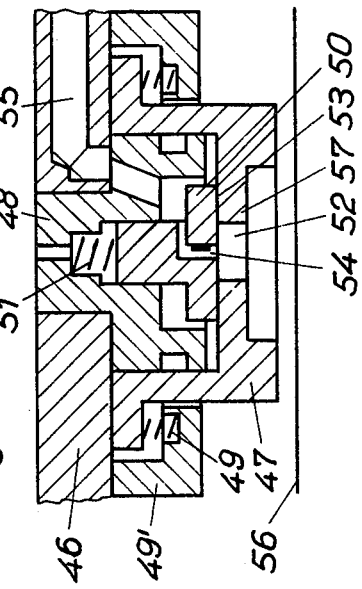

DEVICE FOR TRANSMITTING A PRESSURE FLUID FROM A STATIONARY SOURCE TO A ROTATING SHAFT

This invention relates to devices for transmitting a fluid under pressure from a stationary source to a movable member, and particularly to a device for transmitting pressure fluid to a rotating shaft for use in apparatus that may be mounted on the shaft.

Many of the devices commonly employed heretofore for transmitting fluid from a stationary source to a rotating shaft are subject to significant losses of fluid by leakage, and the seals employed in other devices to avoid such leakage consume significant amounts of energy by friction.

It is an object of this invention to provide a fluid transmitting coupling device between a stationary source of pressure fluid and a movable member, such as a rotating shaft, which avoids leakage losses without increasing the frictional forces tending to impede rotation of the shaft.

Basically, this object is achieved by reducing the area of movably engaged stationary and rotating sealing elements to a small acute angle relative to the axis of rotation.

In its more specific aspects, the device of the invention includes an annular sealing member fixedly mounted on the rotating shaft and having an engagement face extending about the axis of rotation in a circular loop. A support is prevented from rotating with the shaft by retaining means and carries a shoe member having a face formed with a recess. The shoe member is biased toward a position of sealing engagement of its recessed face with the engagement face of the sealing member during rotation of the shaft, whereby the recess is covered by the engagement face. A manifold conduit system in the shaft and the sealing member includes a plurality of communicating branch conduits having respective, circumferentially spaced orifices in the engagement face of the sealing member. The recess in the shoe member sequentially communicates with the orifices during rotation of the shaft. The recess in the shoe member is supplied with the pressure fluid, and a check valve in each branch conduit responds to the pressure of the fluid in the communicating recess for opening the associated branch conduit.

Other features, additional objects, and many of the attendant advantages of this invention will readily be appreciated as the same becomes better understood by reference to the following detailed description of preferred embodiments when considered in connection with the appended drawing in which:

FIG. 8 is a perspective view of a modified shoe member for use in the device of FIG. 7;

FIGS. 8a to 8d illustrate sequential stages of cooperation of the shoe member of FIG. 8 with an associated check valve in elevational section;

FIG. 9 illustrates a further modification of the shoe member of FIG. 8 in a corresponding view;

FIGS. 9a to 9c illustrate the cooperation of the shoe member of FIG. 9 with an associated valve in the manner of FIGS. 8a to 8d;

FIG. 10a illustrates an automatically retracted shoe member and associated elements for use in any one of the devices of FIGS. 1 to 7 in a first position and in a view corresponding to that of FIG. 2; and FIG. 10b shows the device of FIG. 10a in a different position.

Figure 1:
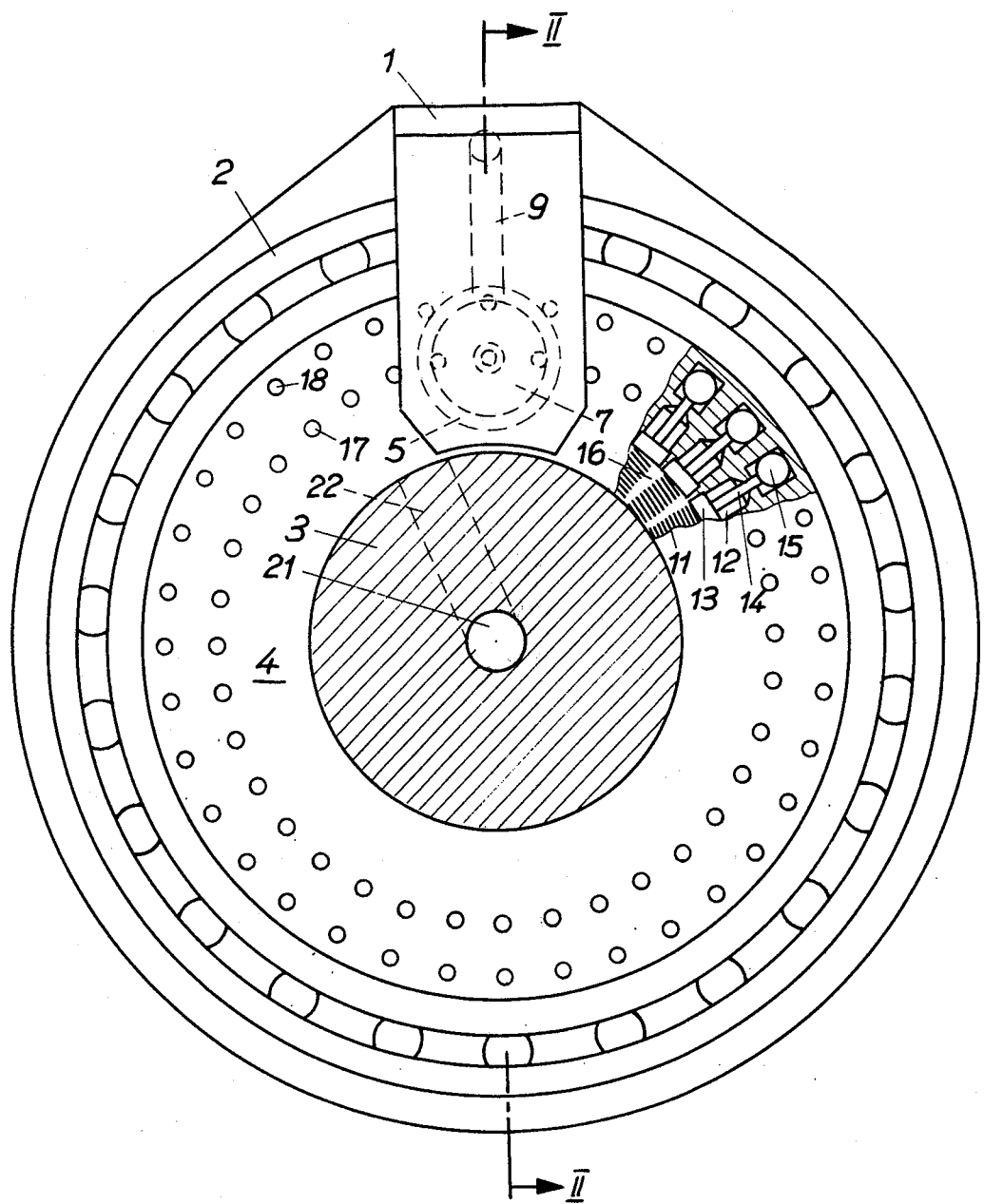
FIG. 1 shows a coupling device of the invention in elevation and in radial section through the associated shaft, portions of a sealing ring being broken away to reveal internal structure.
Figure 2:
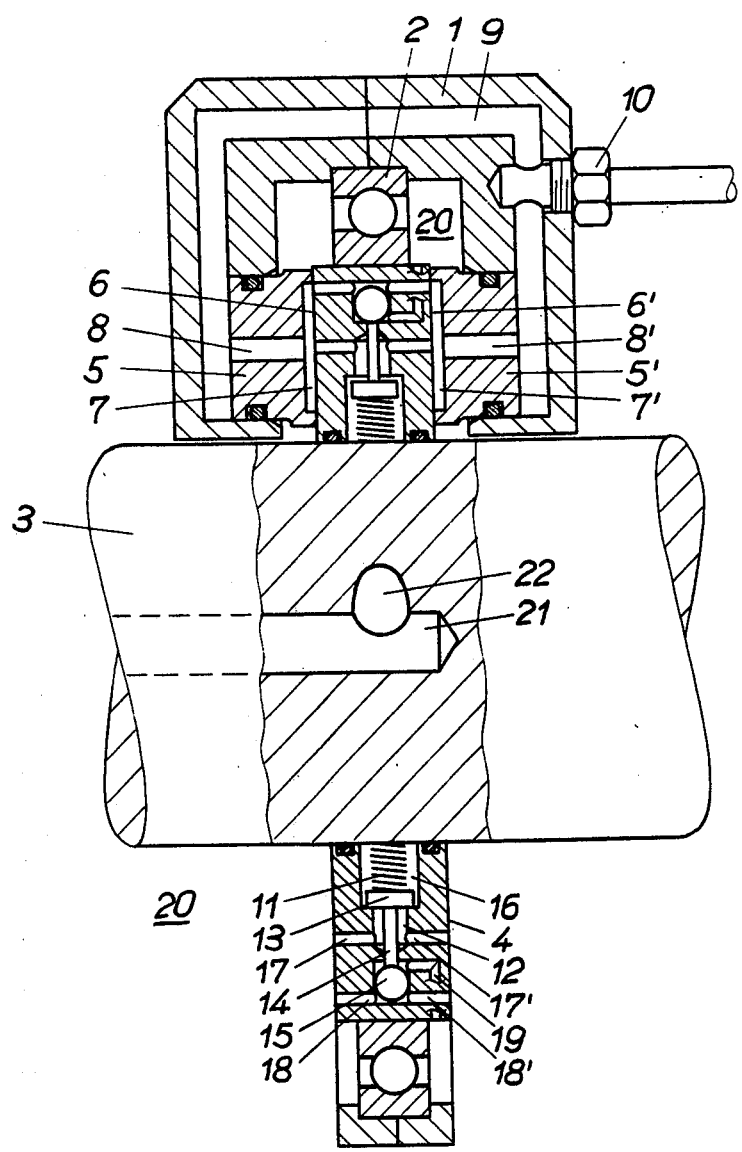
FIG. 2 illustrates the device of FIG. 1 in section on the line II — II.

Referring now to the drawing in detail, and initially to FIGS. 1 and 2, there is seen an approximately channel-shaped support 1 mounted on the outer ring of a ball bearing 2. A shaft 3 fixedly carries a sealing ring 4 whose outer circumferential face is attached to the inner ring of the bearing 2. Narrow sections of the ball bearing 2 and the sealing ring 4 are received in the circumferentially open cavity or space 20 bounded by the support 1.

Two opposite bores in the flange parts of the support 1 are open toward the space 20 and toward each other axially relative to the shaft 3 and slidably receive respective cylindrical shoe members 5, 5'. Flat first end faces of the members 5, 5' sealingly engage respective radial faces 6, 6' of the ring 4 during operation of the apparatus and are formed with shallow circular recesses 7, 7' bounded by narrow circular rim portions of the respective end faces. In the illustrated condition of the apparatus, the recesses 7, 7' are covered by the engagement faces 6, 6' of the ring 4. Axial bores 8, 8' in the shoe members 5, 5' connect the recesses 7, 7' with a duct 9 in the support 1. A pressure line 10 connected with the duct 9 serves as a stationary source of gaseous or liquid pressure fluid and simultaneously serves as a retaining element for preventing rotation of the support 1 with the shaft 3 about the axis of the latter. Second end faces of the shoe members 5, 5' are directed away from the engagement faces 6, 6' and exposed to the pressure of the fluid over an area greater than that of the recesses 7, 7', whereby the shoe members are biased toward the associated engagement faces by the pressure fluid.

The shaft 3 and the sealing ring 4 are formed with a manifold conduit system which includes a central, axial bore 21 in the shaft 3, a radial bore 22 leading from the bore 21 to an annular manifold conduit 16 in the inner circumferential face of the sealing ring 4 and a multiplicity of radial branch conduits 12 equiangularly distributed in the ring 4 as is best seen in FIG. 2. Each branch conduit 12 is of circular cross section over its entire length, but varies in diameter. The radially innermost portion may be sealed by a valve disc 13 in the manifold conduit 16 under the pressure of a helical compression spring 11.

A stem 14 on the valve disc 13 is centered in the conduit 12 and passes radially outward from the disc 13 through a reduced central part of the conduit 12 in sealing enagement with the walls of the branch conduit. Its end remote from the disc 13 carries a spherical valve actuator 15 which may move radially in the cylindrical, radially outermost part of the branch conduit 12 with minimal clearance. Orifices 17, 17' lead from the branch conduit 12 between the valve disc 13 and the reduced, central conduit part toward the engagement faces 6, 6' respectively, and orifices 18, 18' lead into the engagement faces 6, 6' from the afore-mentioned outermost part of the branch conduit 12 beyond the actuator 15. A restricted venting conduit 19 leads from the outermost part of the branch conduit 12 near the stem 14 to the space 20 and the atmosphere.

The first embodiment of the invention illustrated in FIGS. 1 and 2 operates as follows:

As the shaft 3 and the ring 4 rotate relative to the support 1, the check valves constituted by the valve discs 13, their springs 11, and the valve seats provided by a wall of the conduit 16 are sequentially opened as the orifices 17, 17', 18, 18' communicate with the pressure line 10 through the recesses 7, 7', and are closed by the springs 11 when disconnected from the pressure line 10. Pressure fluid thus flows practically continuously from the line 10 to the bore 21. Leakage losses are limited to the small amounts of fluid that can pass the stem 14 in the central portion of the branch cconduit 12 or the spherical valve actuator 15 in the radially outermost portion of the conduit 12.

The valve disc 13 may be lifted from its seat against the restraint of the spring 11 even if the pressure in the line 10 is lower than that in the bore 21 as long as it is higher than the pressure of the atmosphere in the cavity 20, the valve actuator 15 being exposed to the line pressure through the orifices 18, 18' and to the atmosphere through the venting conduit 19.

If delays in the opening of the check valves are to be avoided in the event of rapid pressure changes in the pressure line 10, it may be advantageous to supply a fluid at constant pressure to the orifices 18, 18'. This is readily achieved by axially splitting each shoe member 5, 5' into two radially off-set, independently movable parts of which the first, radially inner part bounds a recess 7, 7' communicating with the bore 8, 8' and is arranged for communicating with the orifices 17, 17', while the second, radially outer part is annular and defines another recess in its end face for communication with the orifices 18, 18' while being connected with a source of fluid at constant pressure in a manner obvious from the showing of the bore 8, 8' and the duct 9 in FIGS. 1 and 2.

Figure 3:
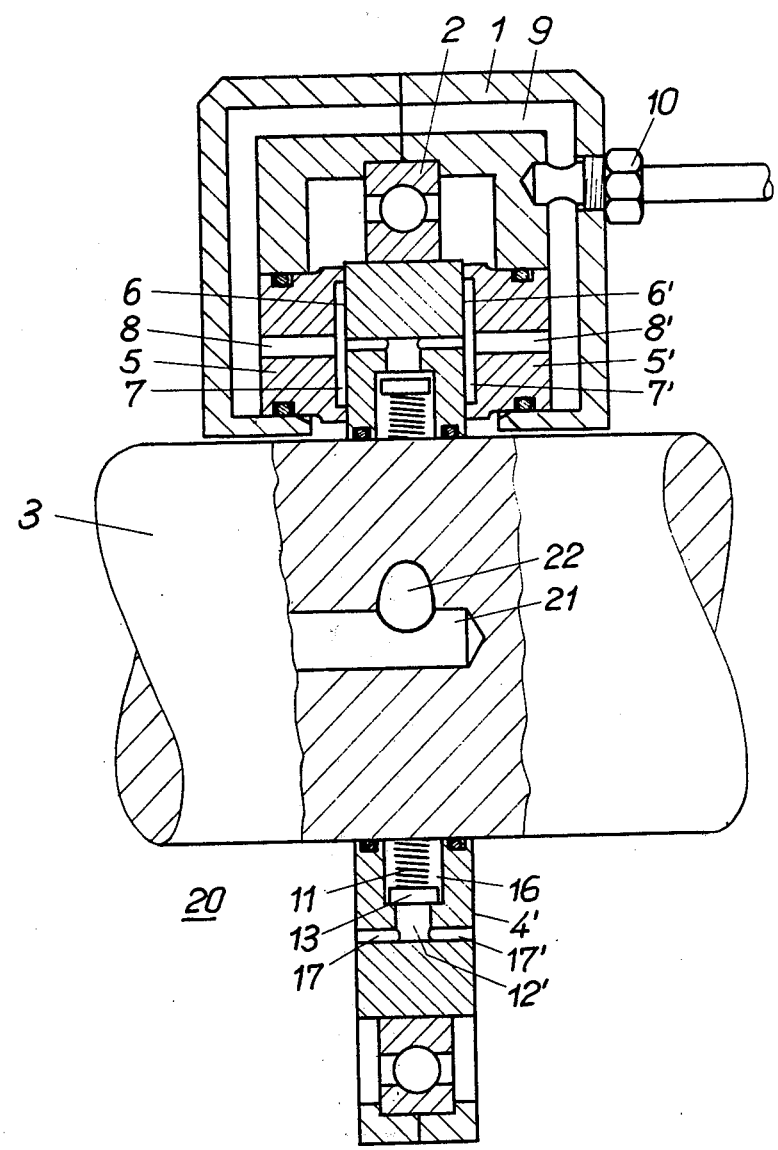
FIG. 3 shows a simplified coupling device of the invention in a view corresponding to that of FIG. 2.

The modified device shown in FIG. 3 is identical with the first-described embodiment of the invention as far as not shown and described otherwise, and identical parts have been provided with the same reference numerals so as not to require repeated description.

The modified device has radially shortened branch conduits 12' in the sealing ring 4'. The branch conduits 12' are provided only with orifices 17, 17'. The actuator 15 and the valve stem 14 connecting the actuator to the valve disc 13 are omitted in the simplified device, whereby the check valves are opened only when the pressure in the line 10 is substantially higher than that in the bore 21 so as to overcome the restraint of the valve spring 11.

Other modifications of the device shown in FIGS. 1 and 2 will readily suggest themselves. Thus, a single shoe member 5 may be provided and the orifices 17', 18' may be omitted. The opening direction of the check valve may be reversed so that the valve responds to a pressure in the recess 7, 7' which is lower than the pressure in the bore 21.

It is not normally necessary to provide retaining means preventing rotation of the support 1 with the shaft 3 other than the pressure line 10 because the torque transmitted to the support by the sealing ring 4, 4' is minimal. The area of frictional contact between the recessed face of the shoe member 5, 5' and the engagement face 6, 6' of the sealing ring 4, 4' is very small, being encompassed by a small acute angle having its vertex in the axis of rotation, as is best seen in FIG. 1. Only a small portion of the orifices 17, 17', 18, 18' communicate with a recess 7, 7' at any one time, a much greater portion of the orifices being open to the ambient atmosphere during the same time.

The fluid in the pressure line 10 and the duct 9 provides the biasing force which biases each shoe member 5, 5' outward of the associated flange part of the channel-shaped support 1 toward a position of sealing engagement of its recessed face with the sector of the sealing ring 4, 4' which is received in the cavity 20 of the support, the circumferential dimension of the sector being defined by the afore-mentioned small acute angle.

The forces transmitted by the shoe members 5, 5' thus are directly proportional to the area of the actually engaged lands or rims of the end faces on the shoe members about the recesses 7, 7' and correspondingly small. The energy losses due to friction between the sealingly engaged stationary and rotating elements are correspondingly small.

The leakage losses at the interface of the engaged sealing elements are also directly related to the size of the engaged area, more specifically its circumference, and are also small in the devices of the invention.

At low and moderate rotary speeds of the shaft 3, the pressure fluid transmitting devices of the invention shown in FIGS. 1 to 3 have been operated with great success. At very high speeds, they are still subject to significant losses of liquid pressure fluid which is discharged by centrifugal forces from the branch circuits 12, 12' to the ambient atmosphere through the orifices 17, 17', 18, 18' when the orifices do not communicate with the recesses 7, 7'. These losses may be avoided by modifications of the sealing ring and of the check valves as is shown in FIGS. 4 to 7, the apparatus being identical with that of FIG. 3 as far as not shown.

Figure 4:
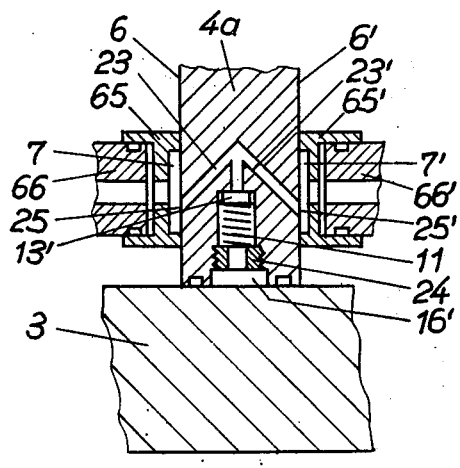
FIGS. 4 to 7 illustrate respective check valves and associated elements in further modified devices of the invention in views analogous to that of FIG. 2.

The shoe members 65, 65' shown in FIG. 4 are mounted on a stationary support 66, only partly seen, and engage faces 6, 6' of a sealing ring 4a whose manifold conduit 16' differs from the conduit 16 in its radial dimensions only so that the valve spring 11 is arranged between an annular, threaded plug 24 in the radial portion of the associated branch conduit and the valve disc 13', also reduced in size to fit into the branch conduit. Respective bores 23, 23' lead from the radially outermost portion of the branch conduit toward respective orifices 25, 25' in the engagement faces 6, 6'. The bores 23, 23', which are parts of the branch conduit, extend from the respective orifices 25, 25' inward of the sealing member 4a in an oblique, radially outward direction relative to the axis of rotation of the shaft 3. A shoulder of the ring 4a in the straight radial portion of the branch conduit constitutes a valve seat for the disc 13' of the check valve, and its spacing from the shaft axis is slightly greater or at least equal to the spacing of the orifices 25, 25' of the branch conduit from the shaft axis.

During the rapid rotation of the sealing ring 4a with the shaft 3, the liquid pressure fluid is driven inward of the orifices 25, 25' by centrifugal forces and does not tend to be lost from the branch conduits even when the latter communicate with the ambient atmosphere.

Figure 5:
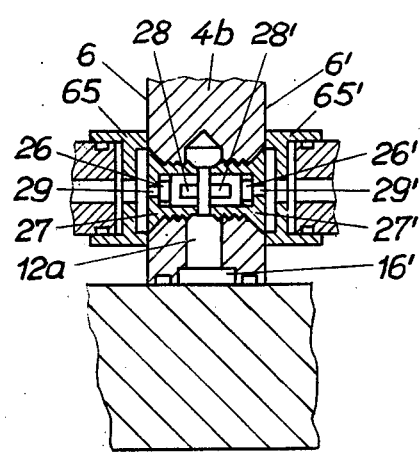
Figure 6:
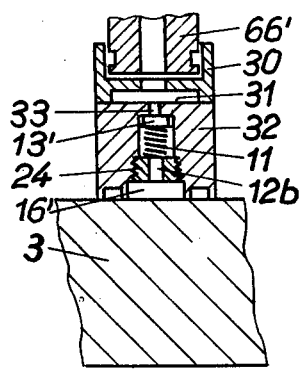
Figure 7:
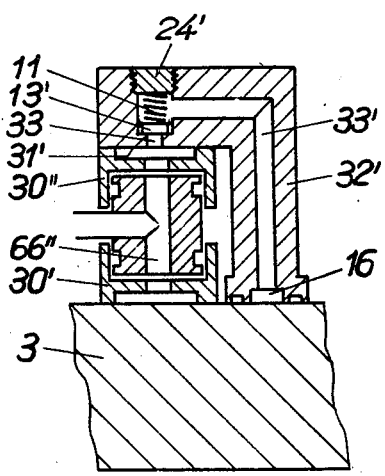

Fluid losses from the orifices of the sealing ring are held to a minimum in the modified devices partly shown in FIGS. 5 to 7 in which the valve discs are located very closely adjacent the orifices.

The sealing ring 4b shown in FIG. 5 has branch conduits 12a which partly extend from the manifold 16' in a straight, radially outward direction and then fork axially toward the two engagement faces 6, 6' respectively. A cup-shaped plug 27, 27' threadedly mounted in each fork, has an end wall flush with a corresponding engagement face 6, 6' of the sealing ring 4b and has an orifice 29, 29' in the end wall whose length is only insignificantly greater than its width. Abutment pins 28, 28' project from the inner surface of the ring 4b into the cavities of the plugs 27, 27' and limit movement of valve discs 26, 26' toward and away from the inner surfaces of the end walls which provide valve seats about the orifices 29, 29'.

The sealing ring 4b cooperates with shoe members 65, 65' substantially as described above. Pressure fluid supplied by the shoe members pushes the valve discs 26, 26' away from the orifices 29, 29' and into engagement with the pins 28, 28'. When the orifices 29, 29' clear the shoe members 5, 5', a minute amount of fluid leaks from the orifices 29, 29' before the flowing fluid drives the valve discs 26, 26' into sealing engagement with the associated valve seats, the fluid pressure in the bore 21, not itself seen in FIG. 5, being higher than atmospheric pressure at all times.

The sealing ring 32 shown in FIG. 6 is provided with straight, radial branch conduits 12b extending from an annular manifold conduit 16' toward a short, restricted orifice 33 in the outer, cylindrical engagement face 31 of the ring 32. The radially innermost end of the branch conduit 12b receives a threadedly mounted, annular plug 24. A helical compression spring 11 is arranged in the conduit 12b between the plug 24 and a valve disc 13' to bias the disc toward a valve seat about the orifice 33. The sealing ring 32 cooperates with a shoe member 30 whose recessed face is cylindrically concave to mate the engagement face 31, but which is otherwise closely similar to the afore-described shoe members 65, 65', and slidably mounted on a stationary support 66' for radial movement toward the face 31 under the biasing pressure of the supplied fluid.

When the orifice 33 clears the shoe member 30 during rotation of the shaft 3, the orifice is quickly closed by the valve disc 13' under the pressure of the spring 11, and the fluid loss is limited, in effect to a volume corresponding to the minute capacity of the orifice 33.

While the engagement face 31 of the ring 32 is convexly arcuate for cooperation with a concavely arcuate, recessed face of the shoe member 30, the relationship of the curvatures may be reversed as is shown in FIG. 7.

The sealing ring 32' has a flat portion which radially projects from the shaft 3, and an integral cylindrical portion axially projecting from the radially outer rim of the flat portion so that the ring 32' has the L-shaped cross section seen in FIG. 7. The branch conduits 33' in the ring are correspondingly L-shaped. The engagement face 31' of the ring 32' is concavely cylindrical and faces the shaft 3. It is formed with orifices 33 which communicate with the branch conduits 33' when a valve disc 13' is pushed away from a valve seal about the orifice 33 against the restraint of a spring 11. A plug 24' in the outer cylindrical face of the ring 32' facilitates installation of the check valve and backs the spring 11. A stationary support 66'' enters the space between the engagement face 31' and the shaft 3 and carries two shoe members 30', 30'' biased in opposite radial directions by the supplied pressure fluid for conforming engagement of their recessed end faces with the outer surface of the shaft 3 and the engagement face 31' respectively.

The device shown in FIG. 7 operates substantially as described with reference to FIG. 6, but the provision of two, oppositely biased shoe members 30', 30'' reduces radial forces exerted on the support 66'' to practically zero, making it possible to mount the support on the supply line for the pressure fluid in the manner shown in FIGS. 2 and 3. It is an additional advantage of the device shown in FIG. 7 that liquid pressure fluid is retained by centrifugal forces in the orifices 33 when the orifices communicate with the ambient atmosphere.

The circular, recessed end faces of the shoe members 5, 5', 65, 65' have very narrow rims or lands for low friction between the sealing elements, as discussed above. At very high rotary speeds of the shaft 3, however, the check valves may not be closed rapidly enough by their valve springs within the short period during which the rim of the shoe member travels over an orifice of a branch conduit. The modified shoe member illustrated in FIG. 8 remedies the leakage losses and noisy valve operation that may result at high-speed operation of the device shown in FIG. 7, and modifications of the device of FIG. 8 for use in other embodiments will be readily arrived at.

The shoe member 34 seen in FIG. 8 has the approximate overall shape of a rectangular plate arcuately bent about an axis parallel to the short sides of the rectangle. The cylindrically convex contact face of the shoe member 34 is formed with an elongated recess 35 separated from the narrow ends of the member 34 by relatively wide lands 36 in both longitduinal directions which correspond to the direction of relative sliding movement of the shoe member 34 and of the associated engagement face of a sealing ring, not shown in FIG. 8. The length of the recess 35 in the direction of relative movement is not substantially greater than one half of the corresponding length of the entire recessed face.

FIGS. 8a to 8d show four sequential relative positions of the shoe member 34 and the orifice 38 of a manifold conduit system during operation of the device. The spring biased valve disc 37 of the check valve seen in FIG. 8a is spaced from the orifice 38 to permit fluid flow from the recess 35. When the orifice 38 is sealed by the land 36, as is shown in FIG. 8b, the valve disc 37 is not immediately seated, but it closes the orifice 38, as shown in FIG. 8c, before the orifice can communicate with the ambient atmosphere, a position shown in FIG. 8d.

FIG. 9 illustrates a shoe member 39 whose overall shape is closely similar to that of the shoe member 34. However, only narrow lands 41 separate the elongated recess 40 in the shoe member 39 from two longitudinal notches 42 which increase in depth with increasing distance from the recess 40. The shoe member 40 is intended for use with check valves whose discs or other valve members are moved only by the flowing pressure fluid without the benefit of a valve spring.

The cooperation of the shoe member 39 with such a check valve, closely similar to the valve described above with reference to FIG. 5, is illustrated in FIGS.

9a to 9c. The valve disc 43 is held remote from its seat 44 by liquid flowing from the recess 40 into the central orifice 45 of the valve seat 44 in the condition of the device shown in FIG. 9a. The valve disc maintains its open position while the land 41 travels over the orifice 45 (FIG. 9b). A notch 42 thereafter permits gradually increasing flow of fluid from the check valve to the atmosphere and thereby causes smooth and silent closing of the valve.

Friction between sealing elements of a device of the invention may be further reduced by the use of a retractable shoe member. This is particularly advantageous with a discontinuous supply of pressure fluid to a continuously rotating shaft. A shoe assembly including a retractable shoe member that may be substituted for the shoe members in any one of the devices described with reference to FIGS. 1 to 7 is illustrated in FIGS. 10a and 10b in the retracted and in the operative position respectively.

Referring initially to FIG. 10a, there is seen a portion of a stationary support 46 on which a generally cylindrical shoe member 47 is movably secured by means of a retaining ring 49'. Helical compression springs 49 distributed over the circular circumference of the ring 49' engage an outer radial flange on the shoe member 47 and tend to retract the latter from the engagement face 56 of a sealing ring, not otherwise shown. The shoe member 47 is tubular, and its bore is restricted to a narrow opening 52 in an internal flange 57. The shallow portion of the bore on the side of the flange 57 directed toward the engagement face 56 is the functional equivalent of the aforedescribed recesses 7, 7'. The portion of the bore on the other side of the flange 57 movably and conformingly receives a guide member 48 fixedly mounted on the support 46. A supply conduit 55 formed in the support 46 and the guide member 48 terminates in a radial face of the latter.

The cylindrical stem of a valve member 50, coaxial with the shoe member 47, is axially guided in a bore of the guide member 48 and has a disc portion biased into engagement with a seating face 53 of the flange 57 by a helical compression spring 51 in the bore of the member 48. A narrow metering passage 54 in the valve member 50 permanently connects the conduit 55 with the opening 52.

FIG. 10a shows the shoe member 47 in the retracted position assumed when the fluid pressure in the conduit 55 is too low to overcome the force of the springs 49. As the pressure in the conduit 55 is increased, the passage 54 cannot release fluid through the opening 52 fast enough to prevent a pressure build-up in the shoe member 47 behind the flange 57. The liquid pressure ultimately moves the shoe member toward the position shown in FIG. 10b against the restraint of the springs 49. The spring 51 being substantially fully relaxed in the condition of FIG. 10a, the valve member 50 does not participate in the movement of the shoe member 47. A gap opens between the members 50, 47, and pressure fluid entering the gap quickly expands the same, pushing the valve member 50 inward of the guide member 48 against the spring 51. The device moves from the position of FIG. 10a to that of FIG. 10b within a small fraction of a second. Leakage of pressure fluid is limited in the retracted position to the insignificant flow through the metering passage 54 under the low pressure in the conduit 55. There is no leakage in the operative position of FIG. 10b.

It should be understood, of course, that the foregoing disclosure relates only to preferred embodiments of the invention, and that it is intended to cover all changes and modifications of the examples herein chosen for the purpose of the disclosure which do not constitute departures from the spirit and scope of the invention set forth in the appended claims.

What is claimed is:

1. A device for transmitting a fluid under pressure from a stationary source to a movable member, said device comprising:
   a. a shaft having an axis and mounted for rotation about said axis;
   b. an annular sealing member fixedly mounted on said shaft and having an engagement face extending about said axis in a circular loop;
   c. a support;
   d. retaining means preventing rotation of said support about said axis with said shaft and movement of said support relative to said sealing member in an axial direction;
   e. a shoe member secured on said support,
      1. said shoe member having a first face formed with a recess and directed toward said engagement face and a second face spaced from said first face and directed away from said engagement face;
   f. biasing means biasing said shoe member to move on said support toward a position of sealing, sliding engagement of said first face with said engagement face during rotation of said shaft,
      1. said biasing means including a source of said pressure fluid, and
      2. a conduit connecting said source to said second face for applying the pressure of said fluid to said second face;
   g. supply means for supplying said fluid from said source to said recess under the pressure thereof,
      1. said recess in said position of sealing engagement being covered by said engagement face,
      2. said shaft and said sealing member being formed with a manifold conduit system including a plurality of communicating branch conduits having respective cirumferentially spaced orifices in said engagement face, said recess sequentially communicating with said orifices during rotation of said shaft; and
   h. a check valve in each of said branch conduits and responsive to said pressure for opening the associated branch conduit when an orifice of said associated branch conduit communicates with said recess.

2. A device as set forth in claim 1, wherein the area of contact between said face of said shoe member and said engagement face is encompassed by a small acute angle having its vertex in said axis, only a small portion of said orifices communicating with said recess at any one time, a much greater portion of said orifices being open to the ambient atmosphere during said time.

3. A device as set forth in claim 1, further comprising valve actuator means associated with each check valve, said actuator means communicating with the ambient atmosphere and with one of said orifices, and being responsive to a pressure above ambient atmospheric pressure in said one orifice for opening the associated check valve.

4. A device as set forth in claim 3, wherein said sealing member is formed with a plurality of radial bores respectively associated with said branch conduits, each radial bore having a restricted portion separating a radially inner first portion of said bore from a radially outer, cylindrical, second portion of said bore, said first portion constituting a part of the associated branch conduit, said check valve including a valve member radially movable toward and away from a branch conduit closing position in said first portion, and said valve actuating means including a stem member fastened to said valve member and passing through said restricted portion in sealing engagement with the walls of said restricted portion, a spherical valve actuator member secured to said stem member in said second portion, respective radial parts of said second portion separated by said valve actuator member communicating with the orifice of said associated branch conduit and with the atmosphere when said orifice communicates with said recess.

5. A device as set forth in claim 1, wherein said engagement face is radial, said sealing member having a second engagement face, a second shoe member being mounted on said support and having opposite first and second faces, said first face being formed with a second recess, said pressure fluid acting on said second face and biasing said second shoe member toward a position of sealing engagement of said first face thereof with said second engagement face during rotation of said shaft, said second recess in said position being covered by said second engagement face, said branch conduits having respective circumferentially spaced orifices in said second engagement face, said second recess sequentially communicating with said orifices in said second engagement face during said rotation of said shaft, said supply means including means for supplying said fluid to said second recess.

6. A device as set forth in claim 5, wherein said support is approximately channel-shaped and defines a cavity open toward said axis, respective sectors of said engagement faces being received in said cavity, the circumferential dimension of said sectors being defined by a small acute angle having its vertex in said axis, said support having two flange portions, said shoe members being movably mounted on said flange portions respectively, said biasing means biasing said shoe members inward of said cavity and toward the respective sectors of said engagement faces, said support being formed with a duct communicating with said recesses and constituting an element of said supply means.

7. A device as set forth in claim 1, wherein only a small portion of said orifices communicate with said recess at any one time, a much greater portion of said orifices being open to the ambient atmosphere during said time, said branch conduits extending from the respective orifices thereof inward of said sealing member in a direction radially outward relative to said axis.

8. A device as set forth in claim 7, further comprising means in each branch conduit constituting a valve seat of said check valve, the spacing of said seat from said axis being at least equal to the spacing of the orifice of the associated branch conduit from said axis.

9. A device as set forth in claim 1, wherein said engagement face is cylindrical about said axis, said biasing means radially biasing said shoe member toward said position thereof.

10. A device as set forth in claim 1, wherein the length of said recess in the direction of relative movement of said shoe member and of said annular member during said rotation of said shaft is not substantially greater than one half of the corresponding length of said face of the shoe member, respective land portions of said face of said shoe member extending from said recess in said direction and in a direction opposite to said direction.

11. A device as set forth in claim 10, wherein said land portions are formed with respective notches spaced from said recess in said directions, each notch being elongated in a direction away from said recess and increasing in depth with increasing distance from said recess.

12. A device as set forth in claim 1, further comprising retracting means for retracting said shoe member from said position against the restraint of said biasing means and responsive to a predetermined pressure of said fluid for releasing said shoe member to movement into said position.

13. A device as set forth in claim 1, wherein said sealing member has an additional engagement face, said engagement faces being radial and axially spaced from each other, said orifice of each branch conduit being axially aligned with another orifice of said branch conduit in said additional engagement face, said check valve being contiguously adjacent one of said orifices, another check valve being located contiguously adjacent said other orifice, a ball bearing being operatively interposed between said sealing member and said support, an additional shoe member on said support having a face formed with a recess, the face of said additional shoe member engaging said additional engagement face, and said recess in the face of said additional shoe member sequentially communicating with the orifices in said additional engagement face during rotation of said shaft, said supply means communicating with said recess in said face of the additional shoe member.

14. A device as set forth in claim 1, wherein said engagement face is concavely cylindrical and spacedly faces said shaft.

15. A device as set forth in claim 14, wherein said biasing means biases said shoe member radially outward toward said engagement face, said support carrying a second, movable shoe member radially aligned with said first-mentioned shoe member, said pressure fluid biasing said second shoe member radially inward into movable engagement with said shaft.

16. A device as set forth in claim 1, wherein said first face of said shoe member is cylindrically arcuate about said axis, said recess is circumferentially elongated, and said shoe member is formed with a bore having respective orifices in said recess and in said second face for passage of said pressure fluid between said faces, said recess being circumferentially longer than the orifice of each of said branch conduits.

* * * * *